US005340119A

United States Patent [19]

Goldfarb

[11] Patent Number: 5,340,119

[45] Date of Patent: Aug. 23, 1994

[54] METHOD OF PLAYING A GAME OF CHANCE AT LOCATIONS REMOTE FROM THE GAME SITE

[76] Inventor: Simon Goldfarb, 525 S. Ardmore Ave. #254, Los Angeles, Calif. 90020

[21] Appl. No.: 11,725

[22] Filed: Feb. 1, 1993

[51] Int. Cl.[5] .................... H04M 11/00

[52] U.S. Cl. .................... 273/439; 273/138 A; 273/138 R; 364/410; 364/412; 379/100

[58] Field of Search .................... 273/439, 138 A, 138 R, 273/139; 364/412, 410; 379/100; 358/400–403

[56] References Cited

U.S. PATENT DOCUMENTS

| | | | |
|---|---|---|---|
| 4,467,424 | 8/1984 | Hedges et al. | 364/412 |
| 4,689,742 | 8/1987 | Troy et al. | 364/412 |
| 4,893,333 | 1/1990 | Baran et al. | 379/100 |
| 4,926,325 | 5/1990 | Benton et al. | 364/408 |
| 4,996,705 | 2/1991 | Entenmann et al. | 379/91 |
| 5,018,736 | 5/1991 | Pearson et al. | 273/439 |
| 5,035,422 | 7/1991 | Berman | 273/439 |
| 5,083,272 | 1/1992 | Walker et al. | 364/412 |
| 5,108,115 | 4/1992 | Berman et al. | 273/439 |
| 5,223,698 | 6/1993 | Kapur | 235/375 |

*Primary Examiner*—Vincent Millin
*Assistant Examiner*—Kerry Owens
*Attorney, Agent, or Firm*—Erik M. Arnhem

[57] ABSTRACT

Participating in a game of chance, such as KENO, played remotely away from the site where the winning numbers are drawn. Each player can mark his predicted winning number combination on a sheet that is inserted into a facsimile machine remote from the game site; simultaneously and automatically charging the cost of playing participation to the player's telephone bill. Information is transmitted over the phone line to a second facsimile machine at the game site, where the information may be computerized and compared with the winning numbers drawn by the game operators. The number-drawing process may be televised, such that players located remote from the game site will learn immediately whether or not they have become winners.

6 Claims, 1 Drawing Sheet

METHOD OF PLAYING A GAME OF CHANCE AT LOCATIONS REMOTE FROM THE GAME SITE

BACKGROUND AND SUMMARY OF THE INVENTION

Many persons enjoy playing games of chance, such as KENO, or other games. However, in some cases a person may not be able to play the game because of transportation problems or for other reasons. Thus, the person may not be physically able to drive a car to the site of a KENO game or to a store where lottery tickets are sold.

The present invention concerns a method of playing a game of chance, such as KENO or the lottery, without having to be physically present at the game site, or without having to travel to a store or other location where lottery tickets are sold.

The method of the present invention involves the use of phone-operated facsimile machines for transmitting game information from each game player to the physical site where the game is being played, i.e. the place where the KENO numbers are drawn, or the winning lottery numbers selected. Simultaneously, when dialing the telephone number to transmit the game information, the game player is automatically charging the cost therefor to his/her telephone bill. Each game player inserts a game sheet containing a predicted winning combination into a facsimile (fax) machine at his residence or where he might be at a particular point in time, e.g. in a hotel room or in a restaurant. Information on the game sheet is transmitted over the telephone line to a receiving fax machine located at the same site, e.g. the KENO hall or the main lottery headquarters. An electronic reader device at the game site will read the duplicate game sheet generated by the receiving fax machine, and electronically tramsmit the information on the sheet to a computer memory and return a receipt confirmation to the game player with date and hour received, and further information as to approximate time of playing and number of the game, personal identification number, etc. The information received by the game operator is stored in the computer memory pending the time when the game is to be played or the winning lottery number drawn. At the designated time the winning numbers are punched into the computer and electronically compared with the numbers in the computer memory to select a game winner (or lottery winner).

The principal advantages of the invention are that each game player can play the game without having to physically travel to the game site or to a lottery sales outlet and can automatically charge the amount played for to his/her telephone bill. Senior citizens, confined to their residences, would especially enjoy the benefits of this invention.

THE DRAWINGS

DESCRIPTION OF A PREFERRED EMBODIMENT OF THE INVENTION

Figure 1:
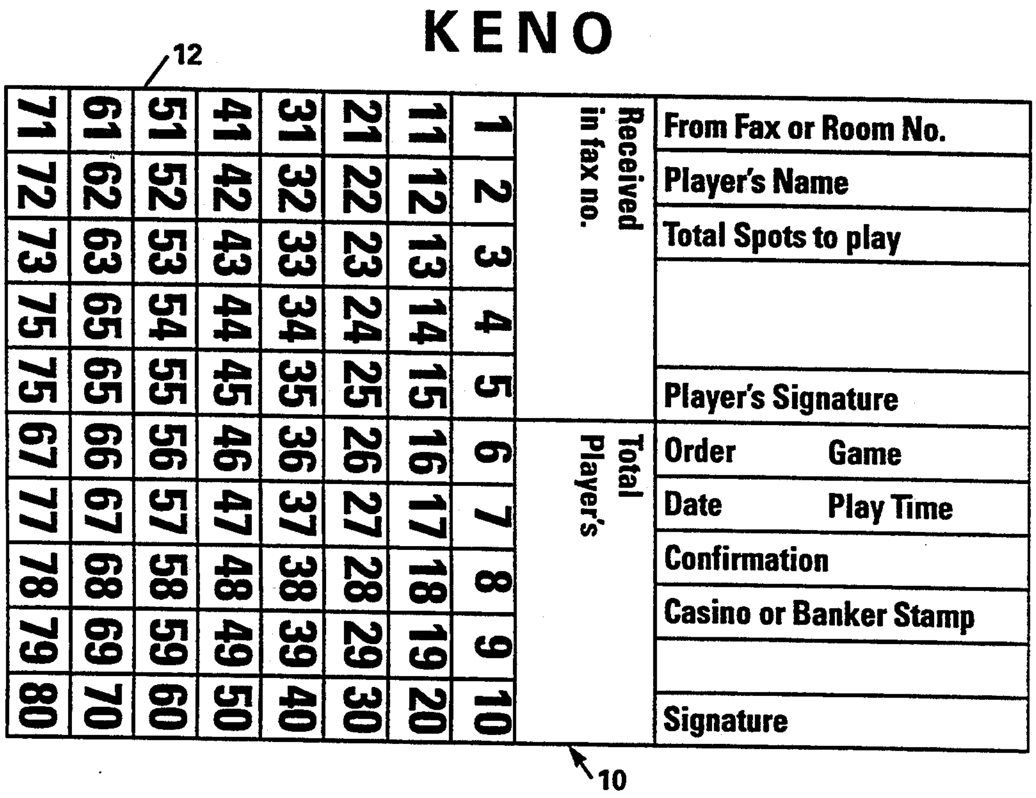
FIG. 1 is a plan view of a game sheet that can be used in playing the game of KENO according to the present invention.

FIG. 1 shows a sheet of paper 10 having marked spaces thereon for placement of information by a person desiring to play the game of KENO without physically travelling to the hall or similar location where the game is being conducted. Sheet 10 is designed for insertion into a conventional phone-operated facsimile machine (hereinafter fax machine) accessible to each person desiring to play the game remote from the game site. In order for the game player to automatically charge for the cost of the game participation, the game operator will e.g. provide a series of prefixed "900" telephone numbers (currently in use in the U.S. for charging the caller's cost to his/her telephone bill) each of which is assigned a dollar amount, e.g. $5.00, $10.00, etc., enabling the game player in transmitting the fax when calling one of the numbers, to indicate the specific dollar amount, chosen by him/her. The dollar amount, thus selected by the game player will automatically and simultaneously be recorded by the telephone operating system and charged to his/her telephone number; the amount charged is eventually forwarded by the telephone system to the game operator. As noted above, a detailed confirmation receipt will promptly be returned by the game operator by fax or otherwise to the game player. The telephone system that is handling the automatic charging of the dollar amount to the game player's telephone bills or account could also be an integral part of the game operator's own business, or linked to a privately used telephone system. Depending on the magnitude of the geographical area involved, such fax machines (and game players) could be location at any game site within one city or state, or several states. Alternately the players could be in any room in a single hotel, or various rooms in a chain of hotels or restaurants.

As shown in FIG. 1, the game sheet includes spaces for insertion of the game player's name, signature, game number, date and time of playing, confirmation number, etc. Space 12 is subdivided into eight vertical columns; said columns being subdivided into ten horizontal rows. The player will mark the appropriate squares with a pencil or pen to indicate his particular account No. in a form that can be read by a reader machine located at the game site. The illustrated system is sufficient to designate numbers containing up to ten digits.

The game player's account number is established prior to the playing of any particular game. It is contemplated that persons desiring to play KENO (or other games of chance such as e g. lottery) will apply to the KENO establishment for an account number. The establishment will issue the person an account number that entitles the person to use the number for playing the game on a remote-play basis. The game could also be played on a "credit" basis, or on a cash-in-advance basis, i.e. by the person putting sufficient funds into his account to cover his game expenses.

The game sheet can be filled out and used at any time prior to the time when the particular game(s) is (are) to be played, i.e. one or two hours prior to game time, or several days prior to the game date.

Figure 2:
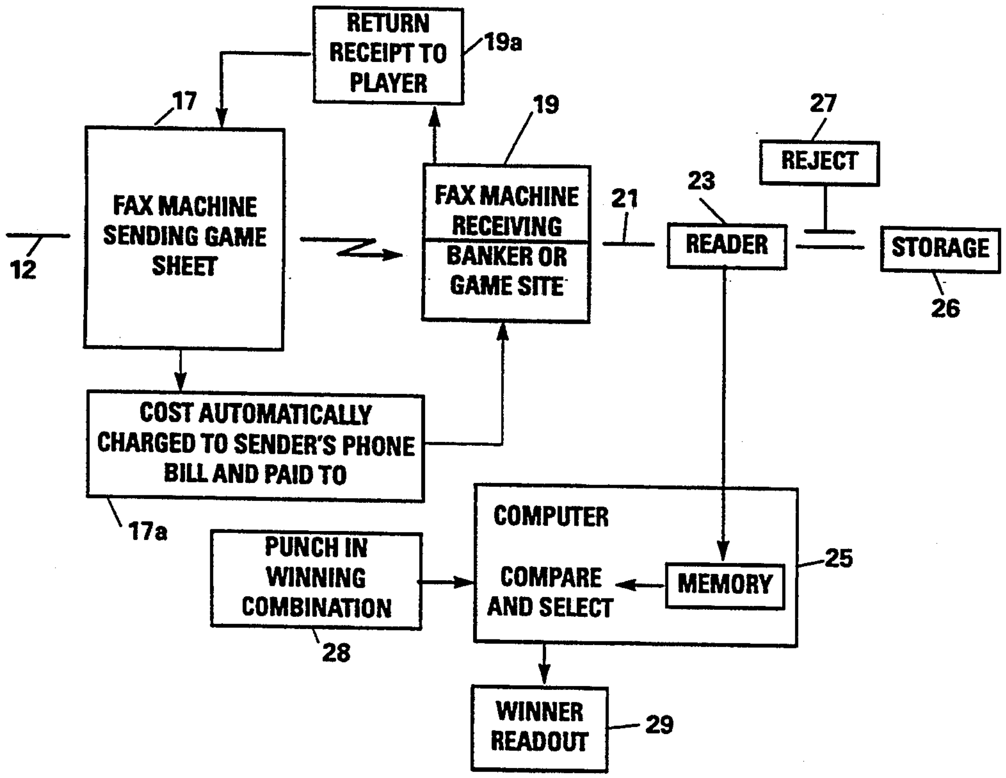
FIG. 2 is a flow diagram showing how information is transmitted, automatically paid for, and utilized during the playing of the game of KENO with the method of the present invention.

FIG. 2 shows generally how the game sheet of FIG. 1 is used during the playing e.g. of a KENO game. The player inserts the completed game sheet 10 into a conventional fax machine 17, whereby the information on the sheet is transmitted over the phone line to another fax machine 19 located at the KENO establishment. The cost of the game participation is charged simultaneously and automatically back to the game person's telephone number, as indicated at 17*a* in FIG. 2. A facsimile (replica) sheet 21 is generated having the same information as sheet 10; a receipt 19*a*, confirming the date/hour received by the operator, including game session number, the amount chosen by the game player, etc. is promptly returned to the game player. Sheet 21 is passed through an electronic reader device 23, which reads and electronically collects the information contained in the respective spaces on sheet 10.

The information is electronically transmitted from reader device 23 to a MEMORY in computer 25. Meanwhile sheet 21 is fed from the reader device to storate 26 for later reference used, if necessary.

In some cases the game sheet 10 may have been filled out incorrectly, or without proper authorization, e.g. the account number may be overdrawn or otherwise not correct. A rejection mechanism 27 may be controlled by the reader device 23 to detour the affected sheet 21 away from storage 26. A human technician can examine the detoured sheet and phone the player to advice him of the situation.

During the playing of a game of KENO in which numbers printed on pellets taking from a KENO goose (or flexible sack) are transmitted or announced to the player, such numbers are punched into a keyboard 28 operatively connected to the associated computer 25. In the computer the selected numbers are compared with the predicted numbers previously put into the computer memory by reader device 23. When, or if, the computer finds a match between the punched in numbers and a particular set of numbers predicted by one or more players, the computer will generate a winner feed-out sheet 29.

Players of KENO games usually want to know as quickly as possible when they have become a winner; part of the game interest is the excitement of being declared a winner. In the remote playing of KENO, as hereinabove described, the event of drawing the numbers is preferably televised, either over a local television station or in a closed-circuit television system (e.g. to all the rooms in a hotel or a group of hotels). The remotely located players can view the T.V. picture, and observe their names being announced as winners.

The computer is preferably selected or sized so that computer operations involved in determining the winners are fast enough to keep pace with the process of drawing the numbered ping pong balls out of the hopper. In cases where there are large number of game players a plurality of computers may be connected to a single number punch-in keyboard, such that the various computers are in their computing modes at the same time.

The description has proceeded on the basis of a KENO game. However, it will be appreciated that the invention could be practiced with other games of chance, e.g. the lottery.

What is claimed is:

1. A method of participation in playing a game of chance prediction of a winning combination, wherein the game players are in various locations remote from the game site, said method comprising the steps of:

a. each game player manually completing a game sheet so that the sheet includes, in machine readable form, at least the game player's identity, fax phone number where the player is located, and predicted winning combination;

b. each game player inserting the respective completed game sheet into a facsimile phone machine at a located remote from the game site, whereby the game sheet information is transmitted over the phone line to a specially designated telephone number having a "900" prefix at the game site, such that the cost of playing the game is charged to the phone number of the game player;

c. the game site operator removing a facsimile of the game sheet from a receiving phone machine located at the game site;

d. the game site operator generating a confirmation copy of the facsimile, and transmitting the confirmation copy back to each game player's phone number via a fax phone transmission process, whereby each game player has a receipt confirming the details of the player's participation in the game;

e. The game site operator sending the facsimile of each player's game sheet through an electronic reader that is connected to a computer memory, whereby the player's predicted winning combination is stored in the memory; and f. the game site operator generating a random number winning combination, and using a computer to compare the winning combination with stored predicted combinations in the computer memory.

2. The method of claim 1, wherein step (f) is televised so that the game players can be made immediately aware of the winning combination.

3. The method of claim 1, and further comprising the steps of:

g. passing the facsimile of each game sheet from the electronic reader through a rejection mechanism for detection of errors on the game sheet that would make the game player ineligible to become a winner, and h. a human technician at the game site phoning the game player the reasons for the ineligibility discovered in step (g).

4. The method of claim 1, wherein step (a) involves each game player writing his signature on the respective game sheet.

5. The method of claim 1, wherein the game of change is KENO, and the game sheet includes a KENO card having spaces thereon designating KENO members, said spaces being adapted for marking to be machine readable.

6. The method of claim 1, wherein step (b) is accomplished so that each game player has a choice of different "900" prefix telephone numbers, each said telephone number having a different cost related to the dollar amount being risked by the game player.

* * * * *